(12) United States Patent
Rugg (10) Patent No.: US 8,992,639 B2
(45) Date of Patent: Mar. 31, 2015

(54) PROCESS FOR PURIFYING SOLID CARBONIFEROUS FUELS PRIOR TO COMBUSTION, LIQUEFACTION OR GASIFICATION USING A ROTARY CHAMBER

(76) Inventor: Peter Rugg, New York, NY (US)

(*) Notice: Subject to any disclaimer, the term of this patent is extended or adjusted under 35 U.S.C. 154(b) by 857 days.

(21) Appl. No.: 12/908,061

(22) Filed: Oct. 20, 2010

(65) Prior Publication Data

US 2012/0096764 A1   Apr. 26, 2012

(51) Int. Cl.
*C10L 9/08* (2006.01)

(52) U.S. Cl.
CPC ............ *C10L 9/08* (2013.01); *C10J 2300/0909* (2013.01); *C10J 2200/15* (2013.01); *Y02E 50/30* (2013.01)
USPC ........................................................... 48/61

(58) Field of Classification Search
CPC ........ C10J 3/30; C10J 2300/0903–2300/0909; C10J 3/62
USPC ............................................... 48/61; 201/27
See application file for complete search history.

(56) References Cited

U.S. PATENT DOCUMENTS

| | | | | |
|---|---|---|---|---|
| 2,289,917 A * | 7/1942 | Lambiotte | ....................... | 201/34 |
| 6,018,090 A * | 1/2000 | Schmidt | ........................ | 588/318 |
| 8,388,813 B1 * | 3/2013 | Livingston et al. | ............ | 202/118 |
| 8,636,818 B2 * | 1/2014 | Kawase et al. | ................... | 48/210 |
| 2005/0247553 A1 * | 11/2005 | Ichikawa et al. | ................ | 202/96 |
| 2010/0319255 A1 * | 12/2010 | Struble et al. | .................. | 48/62 R |
| 2011/0057060 A1 * | 3/2011 | Sprouse | ........................... | 241/19 |
| 2011/0214343 A1 * | 9/2011 | Wechsler et al. | ................ | 44/605 |

* cited by examiner

*Primary Examiner* — Matthew Merkling (57) ABSTRACT

Solid carboniferous fuels contain varying quantities of moisture, mercury, chlorine, nitrogen, sulfur, heavy metals and other materials that attain vapor pressure at elevated temperatures. The cost effective removal of these degrading and sometimes hazardous materials is important to the further use of the fuel for combustion as a solid, liquid, or gas. The solid fuel is cut, shredded, ground or sieved to appropriate size, and heated in a chamber that can exclude oxygen and air thus preventing ignition. The unwanted materials are driven in the gaseous state and extracted for disposal. The solid fuel cleaned of pollutants exits the chamber and is cooled below ignition temperature prior to contact with oxygen. The solid fuel thus purified is more appropriate for combustion, liquefaction or gasification due to the reduced costs in use as a fuel or in the post combustion clean up.

22 Claims, 8 Drawing Sheets

PROCESS FOR PURIFYING SOLID CARBONIFEROUS FUELS PRIOR TO COMBUSTION, LIQUEFACTION OR GASIFICATION USING A ROTARY CHAMBER

CROSS-REFERENCE TO RELATED APPLICATIONS

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

FIELD OF THE INVENTION

The present invention relates to the general topic of clean fuels for use in future combustion. The need for clean fuels is urgent to prevent further worldwide air pollution by harmful contaminants inherently present in nearly all carboniferous fuels. These contaminants, if not removed from the fuel feed stock are either released upon combustion, or costly to remove after liquefaction or gasification. Typical fuels are coal and the hydrocarbons that can be released from coal, and numerous biomass species such as switch grass, wood, bone, algae, and peat to mention the most common. Since many of the contaminants are harmful to all forms of life, a considerable effort has been undertaken over the last several decades to find ways to release and capture these contaminants prior to combustion. Some of these contaminants can then be re-processed for useful purposes while some must be sequestered or safely disposed of in other ways. The present invention provides novel means for releasing and capturing most of the inherent contaminants prior to the numerous existing pyrolyzing and hydrolyzing processes, thereby giving rise to a more efficient and less costly way for obtaining a contaminant free fuel. By removing water vapor and other contaminants such as Hg, Cl, S, As and the like, a more efficient hydrolysis process can take place to cause the resulting to be cheaper, less polluting and to have higher caloric value.

BACKGROUND OF THE INVENTION

Coal and biomass hydrolysis, in which a portion of coal and/or biomass is converted into a series of useful, high caloric gases, was first developed as early as the eighteenth century. However, commercial conversion to liquid or gas became more widespread in the early to mid 1900's. Intense renewed interest in pyrolysis to upgrade a variety of raw coals was spurred by the tensions between the West and the oil rich nations of the Middle Eastern countries in the 1970's. In general, depending on the nature of the raw coal and/or biomass in addition to the exact nature of the pyrolysis process, the gas and char from coal and biomass pyrolysis generally contains water vapor, and compounds of chlorine, mercury, additional heavy metals, hydrogen sulfide, and a range of hydrocarbon volatiles. Any solid, non-volatized coal char will contain carbon, a range of hydrocarbon compounds, and traces of other minerals and elemental compounds. The volatized gases can be separated and the individual gaseous products can be further processed for useful chemical applications. At the same time, burning coals and biomass that have been properly pyrolyzed, reduces air pollutions and hence human health hazards such as emphysema, asthma, and lung cancer. The large number of issued patents involving pyrolysis, liquefaction or gasification of coal gives a broad picture of the utility and profitability of the conversion of coal to achieve a cleaner hydrocarbon fuel.

The history and detailed time-line of coal pyrolysis are well documented and found on a variety of websites. Details of a pyrolysis process can be found, for example, in "Kinetic Studies of Gas Evolution During Pyrolysis of Sub-bituminous Coal," by J. H. Campbell et al., a paper published May 11, 1976 at the Lawrence Livermore Laboratory, Livermore, Calif. Numerous issued U.S. patents describe methods for the reduction of sulfur in coal, for example, U.S. Pat. No. 7,056,359 by Somerville et al. Their process involves grinding coal to a small particle size, then blending the ground coal with hydrated lime and water, followed by drying the blend at 300-400 degrees F. U.S. Pat. No. 5,037,450 by Keener et al. utilizes a unique pyrolysis process for denitrifying and desulfurizing coal. Here the sulfur and nitrogen content of coal is again driven off in gaseous form and sequestered for possible further use.

Related art is described in U.S. Pat. No. 4,862,485, which teaches means for forming coal pellets by mixing coal particles with polyvinyl alcohol, calcium oxide and/or magnesium oxide and water. U.S. Pat. No. 4,738,685 teaches how to cold press coal fines with molasses, an inorganic hardening agent such as calcium carbonate, calcium phosphate, iron oxide, aluminum oxide and optionally with an acid. Additional teachings relevant, though differing from the present application can be found in U.S. Pat. Nos. 4,618,347, 4,586,936, 4,169,711 and 5,916,826. Patent application No. 20100162619 describes a method using a Mallard process at a pressure of 5 bar at an elevated temperature for compacting biofuels together with some limited amount of peat or lignite.

A more recent system has been proposed and published as USPTO application 20090020456 (Jan. 22, 2009) by Tsangaris et al, relating to the gasification of fossil fuels, fuels which are then used to process a variety of unconventional sources of oil sources such as tar sands and shale oil.

The present application describes unique and novel systems and methods for obtaining calorically rich combustibles, nearly contaminant free combustibles for gasification consisting of coal and biomass. The invention involves the pre-processing of the coal and biomass so resulting in major energy saving during the gasification stage. The biomass can consist of algae, switch grass, wood matter, such as sawdust and/or wood chips, as well as manure to mention a non-exhaustive number of useful caloric components.

One of the several ways the present invention is particularly efficient is that it greatly reduces the water vapor that is released from coal and biomass upon heating in a typical kiln. The fuel to be gasified which has already had the water removed makes the gasification considerably more efficient. At the same time, other contaminants such as S, $H_2S$, Cl, Hg and several heavy metals which have also been removed prior to gasification increases the efficiency and quality of the gasification process. Some of these pollutants can then be reprocessed for further useful applications. This form of waste management is becoming recognized world wide as a necessary and achievable goal to reduce air pollution and potential global warming.

While some of the waste products from the burning of fossil fuels and biomass can be-recovered or recycled, most are disposed of in landfill. This type of disposal is wasteful and in itself potentially polluting, clearly not an environmentally friendly or economical way to proceed. Various government agencies have now put laws into effect that make certain forms of this type of disposal illegal which can result in substantial fines.

SUMMARY OF THE INVENTION

The present invention describes an apparatus and method for pre-processing coal and biomass that save energy in the gasification process. Specifically, the pre-processing kiln is attached to a water cleanup station to capture the water vapor that is released near the proximal end of the kiln. A wet scrubber is attached near the distal end of the kiln to capture pollutants and certain hydrocarbons prior to gasification. The removal of both the water vapor and the pollutants greatly reduces the cost of the gasification process. Means for sizing the coal and biomass also aids in the efficiency of the gasification process.

BRIEF DESCRIPTION OF THE FIGURES

FIG. 5 a show a side view of the kiln used for pre-processing the coal and bio fuels prior to gasification.

DETAILED DESCRIPTION OF THE INVENTION

The present invention describes a system and method for pre-processing coal and biomass prior to gasification. The basic components utilize, a source of coal and biomass that brings the coal to a desired size using a first sizing tool for reducing the coal to maximize efficiency a second sizing tool to cut or shred the biomass to the optimum size for operation in the a kiln. The main objective is to remove as much water and other contaminants in the kiln prior to the step of gasification of the kiln contents. The kiln is one that has an outer shell and an inner core concentrically positioned within the outer shell, the inner core free to rotate within the outer shell. The kiln temperature is controlled by way of master control module which also controls the speed of rotation of the inner kiln core, receives signals from the thermal sensors within the kiln and regulates the oscillatory motion of the two sizing tools which operate by way of a motor that causes and up and down motion of a piston to shred the biomass and crush the coal to their desired sizes. The thermal signals also are used to regulate the temperature of the kiln by way of heater coils affixed to the outer surface of the kiln outer shell.

The sized coal and biomass are directed to a hopper by way of a chute from each sizing tool, where the hopper is affixed to the proximal end of the kiln and where the proximal end has an airlock attached to the kiln outer shell so that the coal and biomass can enter the kiln without admitting oxygen to the kiln. On heating of the coal and/or biomass, water vapor is emitted and drawn off to a water cleanup station by way of a duct extending from near the kiln's proximal end. The water can then used to generate steam in a separate steam generator unit which provides high pressure steam for operation of a gasifier that processes the pre-processed coal and biomass from kiln. A duct is positioned near the distal end of the kiln, to withdraw gaseous contaminants such as Cl, Hg, S, Se, and As and some hydrocarbons into a wet scrubber which separates and sequesters the contaminants for future use or safe disposal. The useful hydrocarbons can also be sequestered separately for further use.

Typically the kiln temperature is controlled by the master control unit in order to maintain the proximal kiln in the range 125-200 C, the distal end in the range 450-500 C. The sized coal and biomass enter the kiln's proximal end though the airlock; are heated without combusting, and exit the kiln at the distal end at the higher temperature with the help of a screw drive. The solid contents of the kiln are moved from proximal to distal end by way of a helical steel rail firmly affixed to the inner surface of the kiln core upon rotation of the kiln core.

The coal sizing tool is a container with one open end with a chute at the opposite end through which the coal exits after sizing. A centrally located piston, has one end within the container connected to a perforated block, with the opposite end located exterior to the sizing tool container. The exterior part of the piston is connected to a motor to cause the piston to undergo vertical oscillatory motion, by crushing the coal within the container to the desired size. The size will be determined by the rate of oscillation and the impact produced by the crusher. The coal moves from the proximal to the distal ends of the sizing tool by way of a conveyor belt positioned at the bottom of the sizing tool container. The preferred volume of the exiting coal is in the range of 0.25-10 cm3.

The biomass sizing tool is a container, open at its front end with a chute attached to the opposite open end through which the biomass exits. The motion from front (proximal) to distal ends makes use of a conveyor belt located at the bottom of the sizing tool. A piston extends into the container with a block attached to the piston and a set of blades attached to the bock. The opposite end of the piston extends outside of the container and is driven by a motor to provide vertical oscillatory motion to the piston and thereby to the blades to produce cutting of the biomass to a preferred size, preferably in the range of 0.25-40 cm3.

The important novelty of the present invention is to provide a system that receives pre-processed coal and or/biomass for further gasification where the pre-processing eliminates most water vapor from the coal and biomass as well as the contaminants. This pre-processing results in a more efficient, cost saving way to gasify coal and biomass where the coal and biomass exit the kiln as a pre-heated char, substantially free of pollutants that would be more costly to remove during the gasification or liquefaction process.

Figure 1:
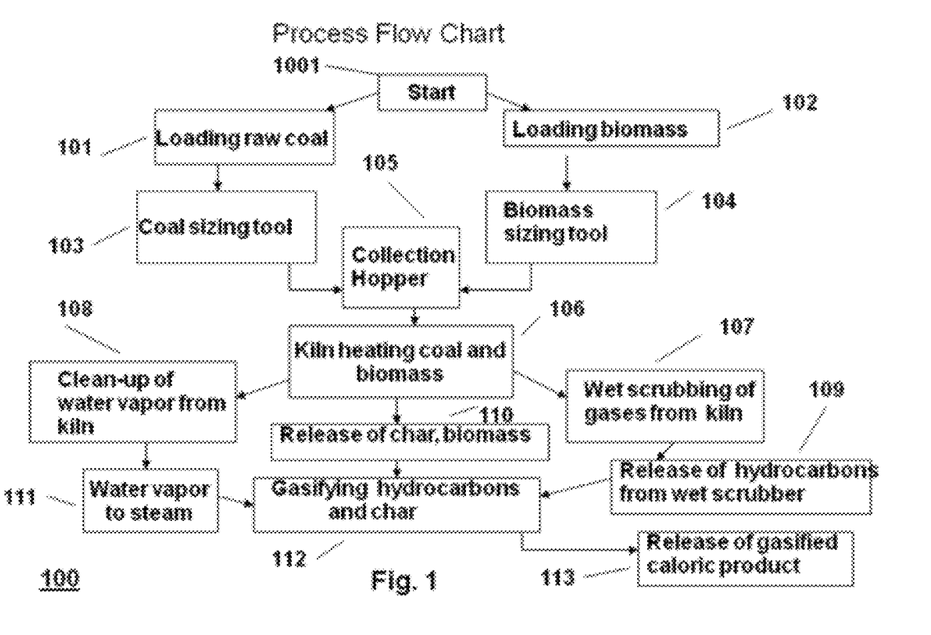
FIG. 1 is a flow diagram illustrating the successive steps required for pre-processing of biomass and coal to be brought to a clean and near contaminant-free condition for efficient gasification.
Figure 2:
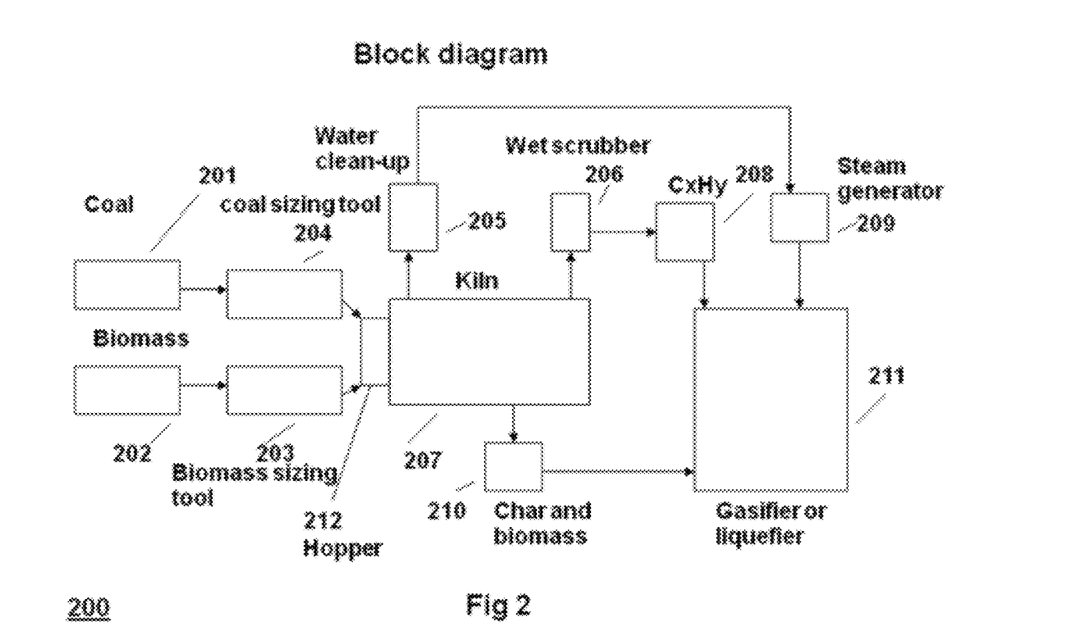
FIG. 2 is a block diagram illustrating the components of the invention and their interconnections to bring the raw coal and or biomass into a state essentially free of water vapor and pollutants for subsequent efficient gasification or liquefaction.

The Invention can be further understood by referring by referring to FIG. 1 where 100 describes the steps of the process invention in conjunction with FIG. 2 which indicates the block diagram in 200. The start of the process is described in FIG. 1 and starts at 1001. This is followed by the loading 101 of coal, the loading 102 of biomass, each into their respective sizing tools to provide the desired sizes of each. The coal is crushed 103 and the biomass is cut or shredded 104. Biomass and coal are collected 105 in collection hopper 105 to be heated in heated kiln 106. Kiln heating results in the emanation of vapor and contaminants which are released from the coal and biomass in the kiln. Cleaning of the hot water vapor 108 from the kiln occurs in a water clean-up station while the other contaminants are wet scrubbed and separated in step 107. Steam is generated instep 111 from the hot water vapor and released for the gasifying process 112. Some valuable hydrocarbons initially mixed with the contaminants are released 109 from the wet scrubber and directed to be further gasified 112. Kiln heat also results in char formed from the hot coal as well as hot biomass, both of which are released in step 110 from the kiln and then further released to be gasified 112.

The steps indicated in 100 are further clarified the block diagram, FIG. 2. 201 and 202 show the initiating steps of available coal and biomass respectively. Coal 201 is fed into sizing tool 204 for obtaining a desired size of coal while biomass 202 is directed into biomass sizing tool 203. The contents of 203 and 204 are directed into hopper 212 by way of separate conveyor belts within sizing tools 204 and 203 (not shown here). Hopper 212 is fixedly attached to kiln 207 where the water vapor developed in the heated kiln near the kiln's proximal end is directed to a water clean-up station 205. After clean-up, the water goes to a steam generator 209 where the steam is then directed into gasifier 211. Contaminants that are given off in heated kiln 207 are drawn off near the distal end of kiln 207 and directed to a wet scrubber that separates and sequesters contaminants from useful hydrocarbons of the type CxHy and directs them to a tank 208. Subsequently the contents of 208 are directed into gasifier 211. The fully pre-process heated contents of kiln 207, consisting of heated biomass and char are emptied into container 210 and then sent by a conveyor belt to gasifier 211. The hydrocarbon contents of 208 are also directed into the gasifier.

Figure 3:
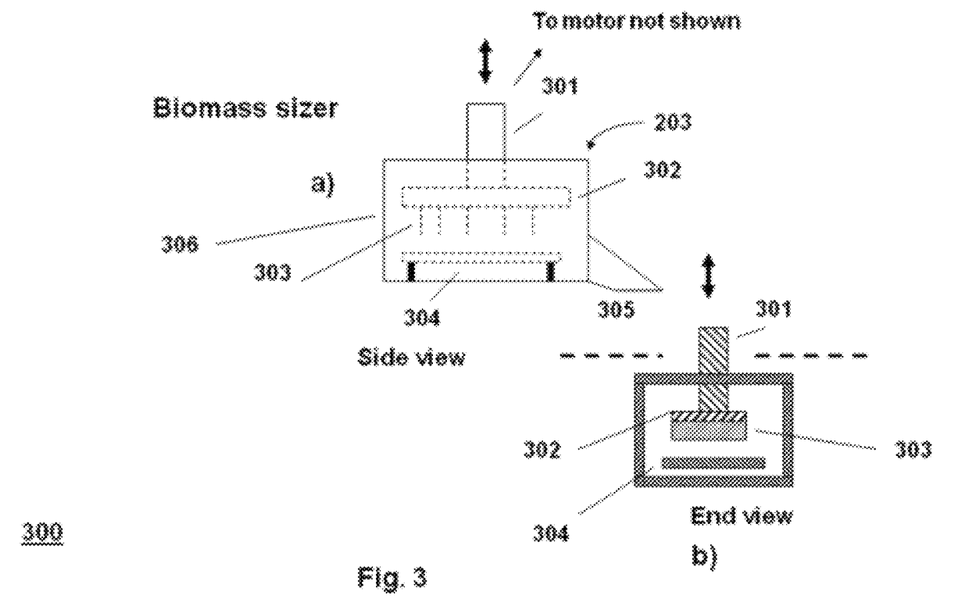
FIG. 3 illustrates a biomass sizing tool consisting of a biomass cutting/shredding device, designed to bring the biomass into a desired shape or volume for further efficient processing. A side and cross sectional end view are shown.

FIG. 3a illustrates the biomass sizing tool 203 shown here in a side view. The side view, shows a portion of piston 301 exterior to the sizing tool container 306, where exterior portion of piston 301 is connected to a motor (not shown) to cause 301 to move in an oscillatory motion with the lower part of piston 301 extending into the interior of container 306 and rigidly attached to block 302. Block 302 is in turn fixedly attached to cutting blades 303. A conveyor belt 304 moves the biomass from the proximal to the distal end of sizing tool 203. The distal end of 203 is attached to chute 305 for emptying the contents of the sized biomass to hopper 212 shown in FIG. 2.

FIG. 3b shows the cross sectional view of sizing tool 203 with piston 301, block 302, blade 303 and belt 304. The double headed arrow indicates the up and down oscillatory motion of piston 301.

Figure 4:
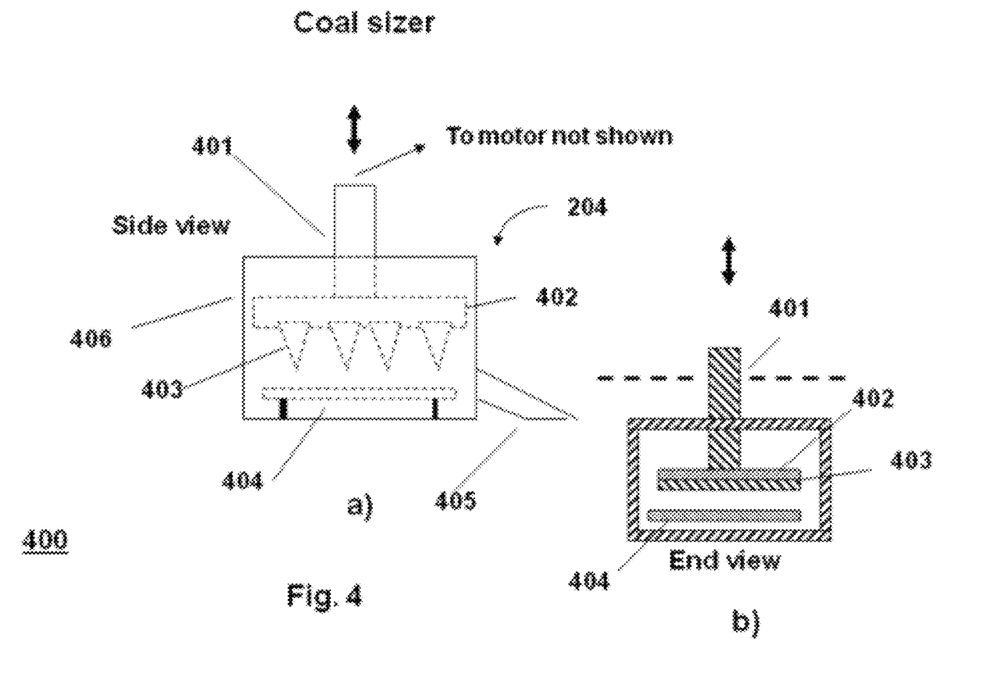
FIG. 4 is a sketch of the coal sizing tool for crushing coal, the device takes feedstock coal and crushes it to the desired shape or volume for subsequent efficient processing prior to gasification. Both a side and cross sectional end view are shown.

FIG. 4 indicated by 400 shows details of coal sizing tool 204. The side view is shown in a) of FIG. 4. A portion of piston 401 is shown outside of coal sizing tool container 406 while a portion of piston 401 extends into the interior of container 406. The end of piston 401 extending into container 406 is attached to block 402 and block 402 is attached to a crusher 403. A conveyor belt 404 moves the crushed coal from the proximal to the distal end of container 406. The distal end of 406 empties the crushed coal by way of a chute 405. The vertical arrows indicated the oscillatory motion of piston 401. A cross sectional end view of the coal sizing tool is shown in b) of FIG. 4 with piston 401, block 402 and crusher 403 as well as conveyor belt 404.

Figure 5A:
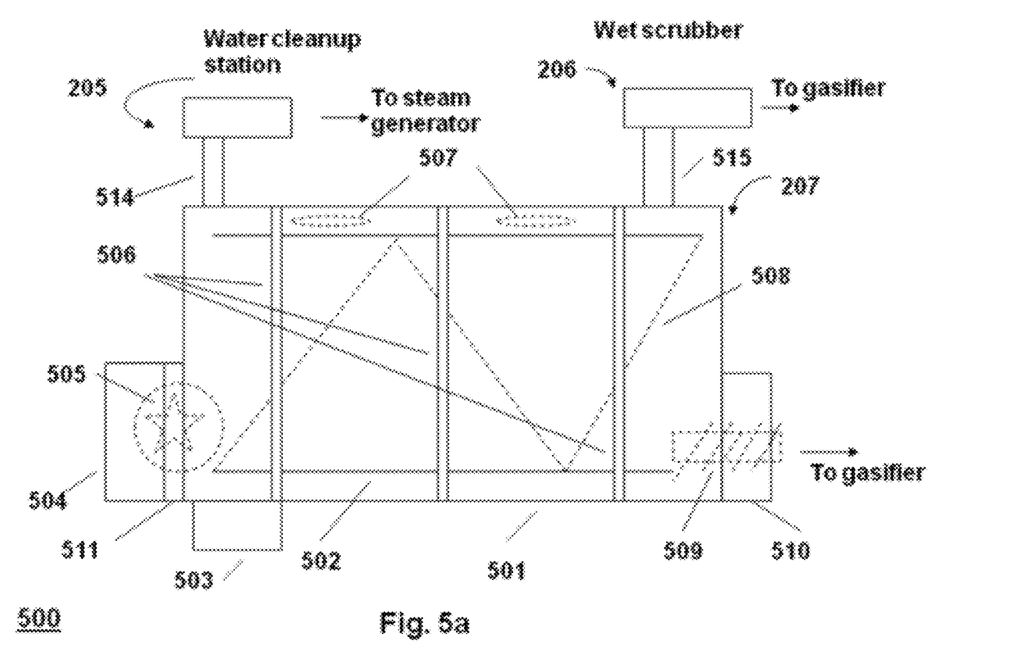

FIG. 5a in 500 shows details in a side view of kiln 207, water cleanup station 205 and wet scrubber 206. Kiln 207 consists of an outer shell 501 and has a concentrically mounted, rotatable inner core 502. Kiln shell 501 has heater coils 506 wrapped around its outer surface. Heat sensors 507 are mounted in the annular space between inner core 502 and outer shell 501. Kiln rotation mechanism 503 is further described in FIG. 5b. An airlock 505 mounted at the proximal end of shell 501 admits the contents of coal and biomass in hopper 504. Airlock 505 prevents air (oxygen) from entering kiln core 502 so that the kiln can be heated without combustion. A helical steel rail 508 mounted onto the inner surface of kiln core 502 causes the contents of kiln core 502 to move from proximal to distal ends upon rotation of kiln core 502. Char ejection screw drive 509 is mounted at the distal end of outer kiln shell 501 serving to discharge the pre-processed coal and biomass from kiln core 502. Open flange 511 at the proximal end of kiln shell 501 connects kiln shell 501 and kiln core 502 to hopper 504 in conjunction with airlock 505. At the distal end, flange 510 fixedly attached to outer shell 501 and outer shell 501 to eject the solid contents of kiln core 501. Duct 514 connects the proximal end of the kiln shell 501 to the clean-up water station 205, while duct 515 connects the distal end of kiln 501 to the wet scrubber. The output of 205 goes to steam generator 209, and the hydrocarbon output of wet scrubber 206 goes to gasifier 211.

Figure 5B:
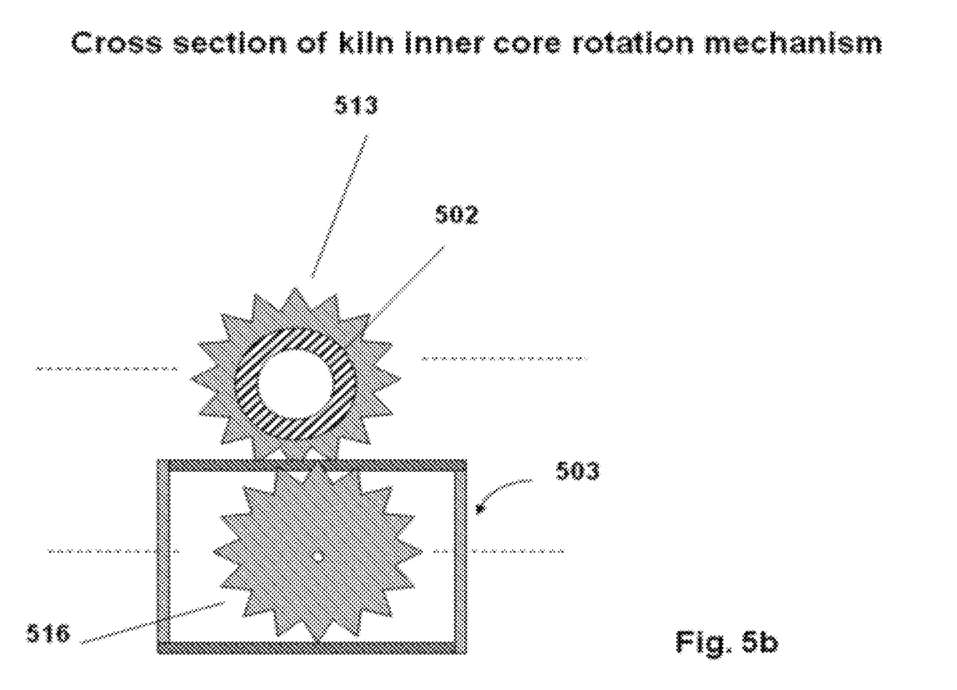
FIG. 5b shows a part of the kiln in cross section along with a motor drive to provide rotation of the kiln during pre-processing of the coal and biomass.
Figure 5C:
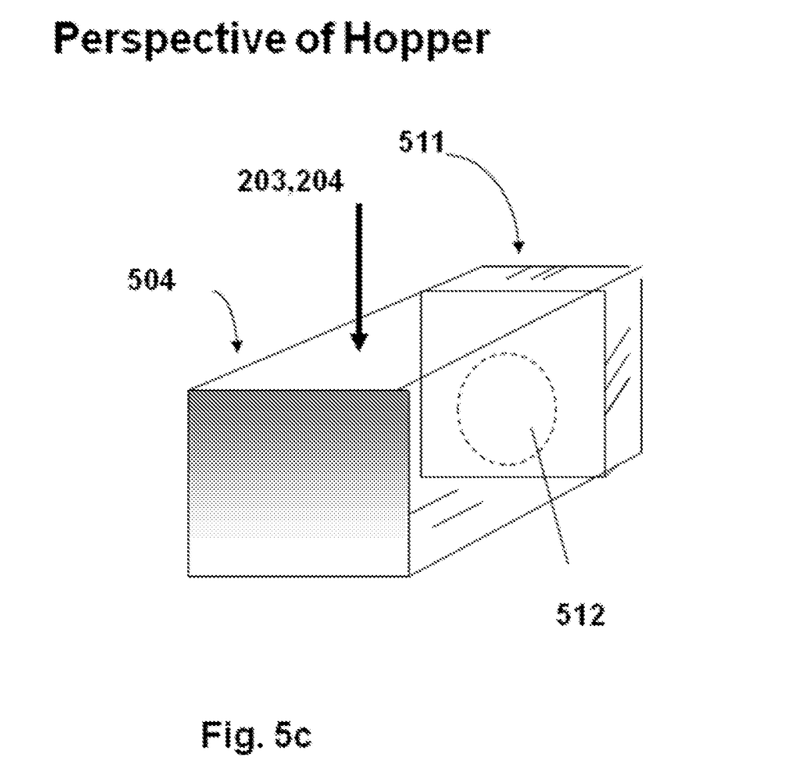
FIG. 5c is a perspective drawing of the hopper, attached to the kiln, where the hopper receives the coal and biomass after each has been cut to the desired size by the respective biomass and coal sizing tool.

FIG. 5b shows a cross section of the kiln rotation mechanism 503. Gear 516 is attached to a motor (not shown) and engages gear 513 which is fixedly attached to the outer circumference of kiln inner core 502. FIG. 5c is a perspective drawing of hopper 504. Shown is flange 511 which is fixedly attached to both hopper and kiln outer shell 501. The drawing indicates the opening 512 which connects hopper 504 to kiln airlock 505.

Figure 6:
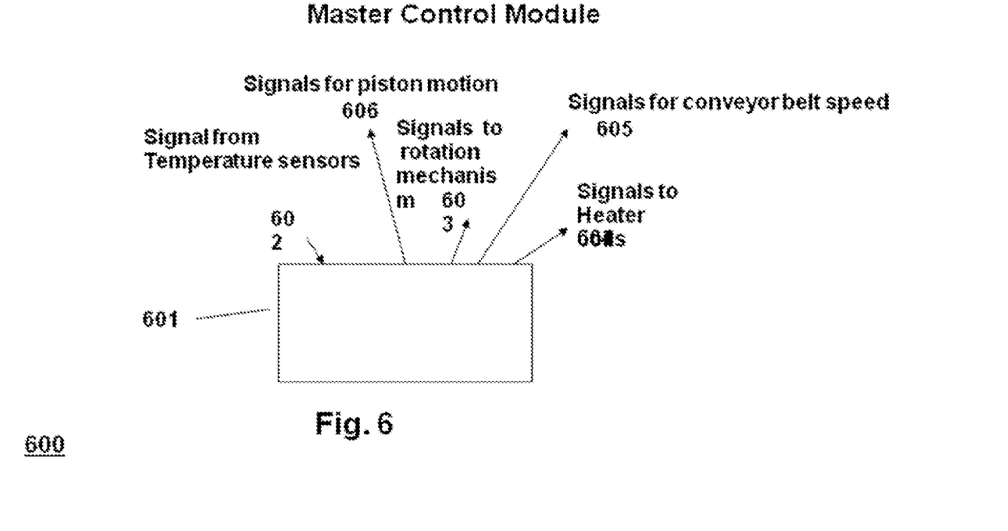
FIG. 6 is a sketch of the master control module that senses temperature of the kiln and in turn controls the temperature of the kiln by way of the kiln heater coils. The module also determines the rate/speed of rotation of the kiln core mechanism.

FIG. 6 is a schematic sketch of the master control module 600. The control box 601 receives signals 602 from temperature sensors. Control box 601 also sends out signals 603 to control the rotation of gear 516 in kiln rotation mechanism 503. In addition box 601 sends out signals 604 to control the temperature of kiln heater coils 506 and controlling signals 605 to control the motion of conveyor belts 304 and 404. Signals 606 control motion of pistons 301 and 401.

Given this disclosure it will become apparent to one skilled in the art that alternative equivalent embodiments are possible. These equivalent embodiments are also within the contemplation of the inventors.

I claim:

1. A system for pre-processing coal and biomass prior to gasification, the system comprising: a source of coal and biomass; a coal sizing tool and a biomass sizing tool; a kiln comprising an outer shell and an inner core and a proximal and distal end, said kiln further comprising means for controlling said kiln temperature; a hopper fixedly attached to said proximal kiln end for receiving coal and biomass; a water cleanup station comprising means for drawing off water vapor from said coal and biomass in said kiln; a wet scrubber comprising means for drawing off contaminants and hydrocarbons emanating from said pre-processing of coal and biomass; a steam generator comprising means for converting said water vapor from said water cleanup station to high pressure steam; a gasifier to gasify said pre-processed coal and biomass from said kiln in conjunction with said steam from said steam generator and hydrocarbons from said scrubber.

2. A system as in claim 1 wherein said kiln further comprises means for rotating said inner core of said kiln, said inner core positioned concentrically within said stationary kiln outer shell.

3. A system as in claim 1 wherein said kiln further comprises thermal sensors located between said kiln inner core and said kiln outer shell.

4. A system as in claim 1 wherein the temperature near the proximal end of said kiln is maintained in the range 125-200 C, said distal end temperature in the range 450-500 C.

5. A system as in claim 1 and wherein said coal and biomass enter said kiln from said hopper fixedly attached to said proximal kiln end, wherein said coal and biomass exit said kiln at said kiln distal end.

6. A system as in claim 1 wherein said kiln further comprises a first connective duct, said one end of said duct is affixed to said water cleanup station, said opposite end affixed near the proximal end of said kiln.

7. A system as in claim 1 further comprising a second duct wherein one end of said second duct is affixed to said wet scrubber, said opposite end of said second duct affixed near distal end of said kiln.

8. A system as in claim 7 wherein said isolated contaminants are at least one of Cl, Hg, S, Se, and As.

9. A system as in claim 1 wherein said kiln comprises an airlock at the proximal end of said kiln, wherein said airlock serves as the input port for said coal and biomass from said hopper.

10. A system as in claim 1 wherein said outer shell of said kiln further comprises a set of coils, fixedly attached to the outer surface of said kiln shell with means for controlling said temperature of said kiln.

11. A system as in claim 1 wherein said kiln comprises a steel helical rail fixedly attached to inner surface of said inner core of said kiln.

12. A system as in claim 1 wherein said kiln further comprises a screw drive at the distal end of said outer kiln shell, said screw drive comprising means for ejecting solid material from distal end of said kiln.

13. A system as in claim 1 wherein said coal sizing tool comprises a proximal open end container and a distal open end, further comprising a chute fixedly attached thereto, and further comprising a centrally located piston, wherein one end of said piston is fixedly attached to a perforated block within said container, said opposite end of said piston located exterior to said container.

14. A system as in claim 13 wherein said opposite end of said sizing tool piston is connected to a motor, said motor comprising means for moving piston and block in a vertical oscillatory motion.

15. A system as in claim 1 wherein said coal sizing tool further comprises a conveyor belt positioned near the bottom of said coal sizing tool container, said belt comprising means for moving said coal from the proximal to the distal end of said sizing tool.

16. A system as in claim 13 wherein said vertical motion of said piston crushes said coal to a preferred volume in the range of 0.25 to 10 cm$^3$.

17. A system as in claim 1 wherein said biomass sizing tool comprises a container with a proximal open end and a distal open end with a chute fixedly attached to said distal end, further comprising a centrally located piston, said one end of said piston connected to a block within said container, wherein said block is fixedly attached to a set of cutting blades.

18. A system as in claim 17 wherein opposite end of said piston is positioned exterior to said container, said opposite end fixedly attached to a motor, said motor comprising means for moving said piston and blades in a vertical oscillatory motion.

19. A system as in claim 1 wherein said biomass sizing tool further comprises a conveyor belt positioned near the bottom of said sizing tool for moving said biomass from proximal to distal end of said sizing tool.

20. A system as in claim 18 wherein said vertical oscillatory motion of said piston and cutting blades results cuts said biomass exiting said sizing tool with a preferred volume in the range 0.25 to 40 cm$^3$.

21. A system as in claim 1 wherein said gasifier and steam generator are connected by duct, said steam from said steam generator directed into said gasifier.

22. A system as in claim 1 wherein said gasifier receives heated coal (defined as char) from said distal end of said kiln and gaseous hydrocarbons from said wet scrubber, said gasifier and kiln fixedly attached by two open flanges, with opposite end of each flange fixedly attached to said distal end of kiln and proximal end of gasifier.

* * * * *